US010824997B2

United States Patent
Hill

(10) Patent No.: US 10,824,997 B2
(45) Date of Patent: Nov. 3, 2020

(54) DEVICES TO CREATE AN INTELLIGENT MEETING ROOM

(71) Applicant: Dell Products L. P., Round Rock, TX (US)

(72) Inventor: John D. Hill, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 324 days.

(21) Appl. No.: 15/884,581

(22) Filed: Jan. 31, 2018

(65) Prior Publication Data

US 2019/0236554 A1   Aug. 1, 2019

(51) Int. Cl.
| | | |
|---|---|---|
| G06Q 10/10 | (2012.01) | |
| G06Q 10/02 | (2012.01) | |
| G06Q 10/06 | (2012.01) | |
| G08B 21/22 | (2006.01) | |

(52) U.S. Cl.
CPC ......... *G06Q 10/1095* (2013.01); *G06Q 10/02* (2013.01); *G06Q 10/06* (2013.01); *G08B 21/22* (2013.01)

(58) Field of Classification Search
CPC .. G06Q 10/1095; G06Q 10/02; G06Q 10/025; G06Q 10/04; G06Q 10/06; G08B 21/22
See application file for complete search history.

(56) References Cited

U.S. PATENT DOCUMENTS

| | | | | |
|---|---|---|---|---|
| 2003/0103075 A1* | 6/2003 | Rosselot | ................ | H04L 41/22 |
| | | | | 715/717 |
| 2006/0239212 A1* | 10/2006 | Pirzada | ................ | H04M 3/424 |
| | | | | 370/260 |
| 2008/0079569 A1* | 4/2008 | Axelsen | ................ | G06Q 10/02 |
| | | | | 340/541 |
| 2013/0237240 A1* | 9/2013 | Krantz | ................ | H04M 3/56 |
| | | | | 455/456.1 |

(Continued)

OTHER PUBLICATIONS

Capterra.com "Energy Management Software: Events2HVAC", description of facility management application, Aug. 4, 2017 (Year: 2017).*

(Continued)

*Primary Examiner* — Kevin H Flynn
*Assistant Examiner* — Michelle E Carey
(74) *Attorney, Agent, or Firm* — Campbell Stephenson LLP; Shiv S. Naimpally

(57) ABSTRACT

In some examples, a computing device may receive sensor data from sensors in a meeting room, determine that the meeting room is unoccupied, and indicate that the meeting room is unoccupied. The computing device may receive a request to reserve a current time slot of the meeting room and indicate that the meeting room is occupied. The computing device may determine that a meeting is scheduled to begin in the meeting room and place meeting-related devices, such as conferencing devices, in an operational state. The computing device may instruct a conferencing device in the meeting room to access a conference bridge. The computing device may determine a presence of indi- (Continued)

vidual meeting invitees in the meeting and display attendance data indicating invitees that are present and invitees that are absent from the meeting. The computing device may automatically send a reminder message to those that are absent.

20 Claims, 6 Drawing Sheets

(56) References Cited

U.S. PATENT DOCUMENTS

| | | | | |
|---|---|---|---|---|
| 2015/0200978 | A1* | 7/2015 | Putterman | G06Q 10/06311 |
| | | | | 709/204 |
| 2016/0063449 | A1* | 3/2016 | Duggan | G06O 10/1095 |
| | | | | 705/7.19 |
| 2017/0006162 | A1* | 1/2017 | Bargetzi | H04N 7/147 |
| 2017/0357917 | A1* | 12/2017 | Holmes | G06Q 10/06314 |
| 2018/0349856 | A1* | 12/2018 | Kalisz | G06Q 10/1095 |

OTHER PUBLICATIONS

Cunningham, Paul, "How to Find Available Meeting Rooms", Jun. 11, 2011, Practical365.com, https://practical365.com/exchange-server/find-meeting-rooms/ (Year: 2011).*

* cited by examiner

DEVICES TO CREATE AN INTELLIGENT MEETING ROOM

BACKGROUND OF THE INVENTION

Field of the Invention

This invention relates generally to computing devices and, more particularly to displaying prebuilt computing devices currently in inventory when a user is configuring a custom computing device to be built for the user.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In a large corporation, employees may have difficulties obtaining a meeting room on-the-fly (e.g., on an ad-hoc basis), without a prior reservation. For example, some employees (e.g., at a high level) may block book rooms for months at a time to ensure a room is available for their use. As another example, employees may anticipate a meeting taking several hours and book a room accordingly but may end up using less than the time for which the room was booked. When employees desire to find a meeting room for use in the near future (e.g., within the next hour), the employees may resort to wandering down the hallways of the building they are located in to try and find an available meeting room.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a computing device may receive sensor data from one or more sensors located in a meeting room, determine (e.g., based on the sensor data) whether the meeting room is unoccupied, and cause a status indicator to indicate whether the meeting room is unoccupied. The computing device may receive, either physically or electronically, a reservation request to reserve a current time slot of the meeting room. If the meeting is currently unoccupied, the computing device may cause the status indicator to indicate that the meeting room is occupied. The computing device may determine that a meeting is scheduled to begin in the meeting room within a predetermined amount of time and place one or more meeting-related devices (e.g., projector, projection screen, computer, video router, audio conferencing device, video conference device, or the like) in the meeting room in an operational state. If the meeting includes a conference call, the computing device may instruct a conferencing device to access a conference bridge and provide an access code to initiate a conference call. The computing device may determine a presence of individual invitees in the meeting and display attendance data indicating meeting invitees that are present and meeting invitees that are absent. The computing device may automatically send a reminder message to the meeting invitees that are absent.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
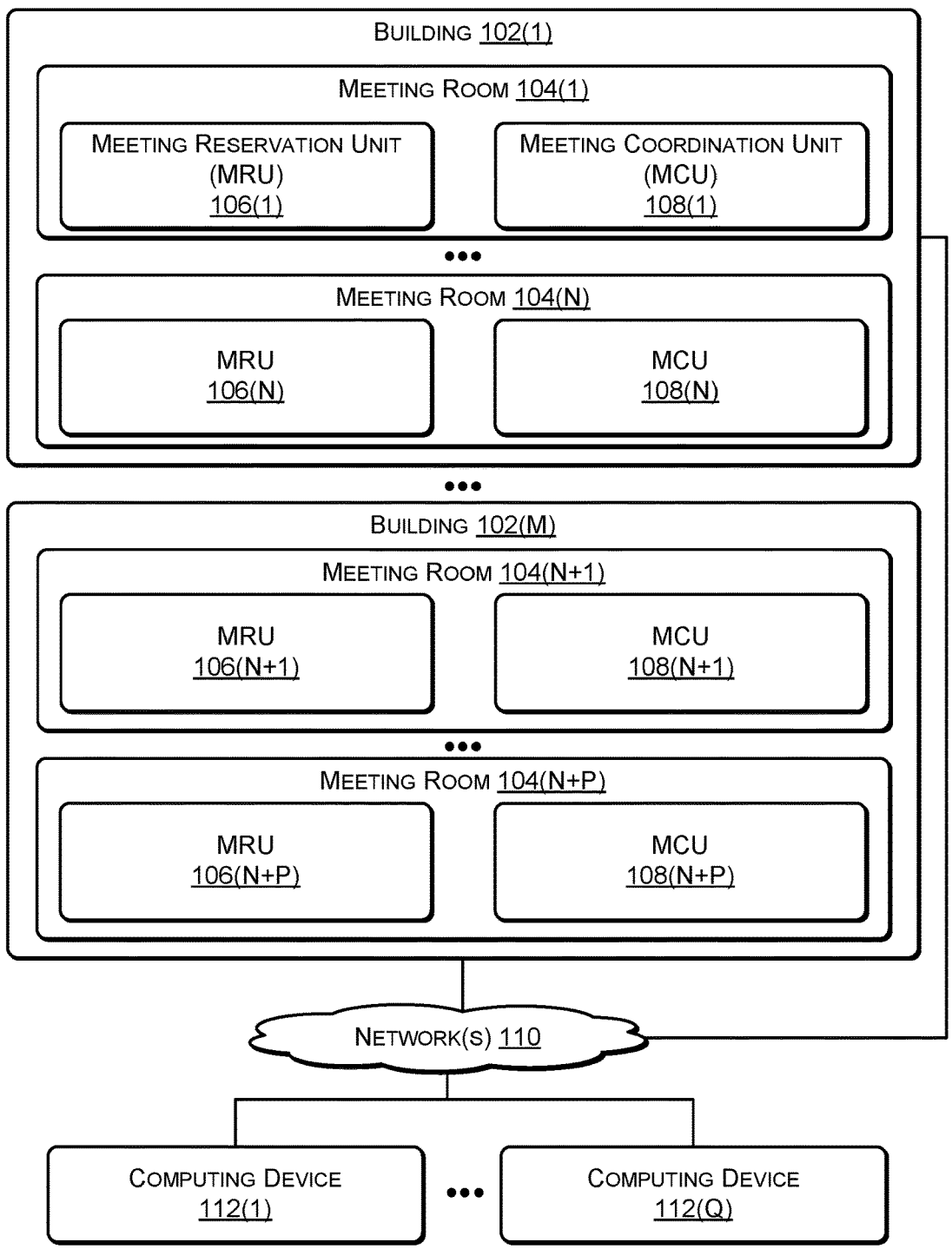
FIG. 1 is a block diagram of a facility that includes at least one building with multiple meeting rooms according to some embodiments.

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O)

devices, such as a keyboard, a mouse, touchscreen and/or video display. The information handling system may also include one or more buses operable to transmit communications between the various hardware components.

An individual meeting room may include an associated meeting reservation unit (MRU), e.g., a type of HIS, such as a specialized hardware unit designed to provide the functions described herein. The MRU may be a specialized hardware device that includes firmware, software, or both to perform the functions described herein. The MRU may enable reservations via walk-up and via a local area network (LAN), such as Ethernet® or WiFi®. The MRU may be positioned outside a meeting room and provide an indication, e.g., using a multi-color light emitting diode (LED), as to the status of the meeting room. For example, a green indicator may indicate that a room is available, and a red indicator may indicate that the room is in use. Thus, the indicator may enable a user to look down a hallway of a building and visually determine which meeting rooms are currently available.

A meeting room may have multiple time slots (e.g., with each time slot W minutes long, W>0) that can be individually reserved. For example, a meeting room may have hour long time slots, such as 8:00-8:59 AM, 9:00-9:59 AM, and so on. At a current time, future time slots may be either reserved or unreserved. For a current time-slot, the MRU may determine (e.g., using a motion sensor, heat sensor, or the like) a status of the meeting room as either occupied or unoccupied, regardless of whether the current time slot was reserved or unreserved. The MRU may provide the status of the meeting room to enable users desiring to a meeting room during the current time-slot to occupy the meeting room. Thus, the status of a meeting room may be occupied, unoccupied, reserved, or unreserved, with occupied or unoccupied being the status of a current time slot and reserved or unreserved being the status of a future time slot.

The meeting room may include one or more sensors, such as, for example, motion detection sensors, heat sensors, another type of sensor, or any combination thereof. The sensors may be connected to the MRU and may be used to detect the presence of humans in the meeting room to enable the MRU to determine whether the room is occupied or unoccupied. For example, if a motion detection sensor does not detect movement in the meeting room within a predetermined time period (e.g., 5 minutes, 10 minutes, 15 minutes, or the like), then the MRU may determine that the meeting room is unoccupied. The MRU may monitor the sensor and, in response to determining that the meeting room is unoccupied, perform power saving functions, such as turning off the room lights and placing various devices (e.g., a computer, a projector, a conferencing device, and the like) in a power-off or reduced power mode. In addition, the MRU may modify the indicator to indicate whether the meeting room is occupied or unoccupied. For example, the meeting room may initially (e.g., the beginning of the day) be green, indicating that the meeting room is available. A user seeking a meeting room may see the green indicator and request to reserve the meeting room for the next N time slots (e.g., where a time slot is a predetermined period of time, such as, for example, 15 minutes, 30 minutes, or an hour). The request may be made physically, e.g., by the user physically pressing a reservation selector on the MRU, or the request may be made by selecting "reserve" via a software application ("app") being executed by the user's computing device (e.g., wireless phone, tablet, laptop, or the like). In response to receiving the request, the MRU may automatically (e.g., without human interaction) change the indicator from green to red to indicate that the meeting room is occupied. After the user has completed the meeting and left the meeting room, the user may indicate that the meeting has concluded or the sensors may provide sensor data to the MRU to enable the MRU to determine that the meeting room is currently unoccupied. For example, the user may indicate that the meeting has concluded by physically pressing "clear reservation" selector on the MRU, or by sending a clear command using the app being executed on the user's phone (or other computing device).

In addition to displaying a physical indication of the status (e.g., occupied or unoccupied) of the meeting room, the MRU may make the status of the meeting room available via a network, such as a LAN. For example, the MRU may include a communications interface to connect the MRU to a network using a wired technology (e.g., Ethernet®), a wireless technology (e.g., WiFi®, Bluetooth®), or another type of communication technology. The MRU may broadcast the status of the meeting room over the network. A user may open a reservation application on the user's computing device (e.g., phone, tablet, laptop, etc.). The application may determine a location of the user using location technology such as, for example, global positioning satellites (GPS), cell-tower triangulation, or Wi-Fi® positioning system (WPS), and display the status of meeting rooms within a selectable distance from the user. For example, the user may select one or more criteria used to filter how many meeting room status indicators are displayed. In some cases, the user may specify a distance, such as N yards (or N meters), and the application may display the status of meeting rooms within a radius of N yards (or N meters) from the user. The user may specify additional criteria to filter how many meeting room status indicators are displayed. For example, in a large facility with multiple buildings, in which each building has multiple floors, the user may initially look at the status of meeting rooms on the same floor as the user. If none of the meeting rooms on the same floor as the user have an available status, then the user may expand the criteria to include all floors of the building in which the user is currently located. If none of the meeting rooms in the same building as the user have an available status, then the user may expand the criteria to include all buildings in the facility in which the user is currently located. The application may enable the user to view which meeting rooms are currently available and may provide a user interface (UI) to enable the user to reserve a currently available meeting room. For example, the user may navigate to a meeting room that the application UI indicates is currently available and select "reserve". In response, the application may send a reserve command to the MRU to reserve the room. The MRU may receive the reserve command and change the status of the meeting room from unoccupied to occupied, e.g., the physical indicator may change from green to red and the MRU may change from broadcasting (e.g., via the network) that the meeting room is unoccupied to broadcasting that the meeting room is occupied.

In some cases, the UI may access a facilities management computer that manages various aspects of the buildings in each facility, such as, for example, heating ventilation and air conditioning (HVAC) systems in each building. For example, the meeting reservations may be used to determine when to heat or cool a particular meeting room. To illustrate, during seasons with cool weather (e.g., winter), the HVAC system may direct heat to meeting rooms in which meetings are scheduled and may not send heat to meeting rooms in which meetings are not scheduled. During seasons with warm weather (e.g., summer), the HVAC system may direct cool air to meeting rooms in which meetings are scheduled and may not send cool air to meeting rooms in which meetings are not scheduled. When a meeting room is currently empty, the facilities management computer may initiate heating or cooling the meeting room a predetermined amount of time (e.g., K minutes, K>0, such as, for example K=10) prior to the start of the meeting to bring the ambient temperature in the meeting room to a predetermined "comfortable" temperature (e.g., L degrees Fahrenheit, such as, for example, L=72). By heating or cooling meeting rooms that are to be used to hold meetings and not heating or cooling unused meeting rooms, energy consumption may be reduced, thereby saving the company money.

In addition, by accessing the facilities management computer, the UI may display available meeting rooms that were previously used for a meeting or will be used for a meeting in a future time slot higher up on the list of available meeting rooms to encourage users to book such meeting rooms. In this way, the predetermined "comfortable" temperature in the meeting room may be maintained to more efficiently use energy. Meeting rooms that were not previously used for a meeting or will not be used for a meeting in a future time slot may be displayed lower down on the list of available meeting rooms to discourage users from booking such meeting rooms. In this way, meeting rooms may have either have meetings scheduled for two or more consecutive time slots or may remain empty for two or more consecutive time slots, enabling more efficient heating and cooling.

The MRU may include an in-room indicator as to the status of the meeting room. For example, assume a user reserves a meeting room for an hour, e.g., from 1:00-2:00 PM. The in-room indicator may begin blinking at a predetermined time (e.g., M minutes, where M>0) prior to the end of the hour. For example, the in-room indicator may begin blinking at 1:50 (M=10) to indicate that the reservation is ending and that the status will change shortly. If the room is available after 2:00 PM, the in-room indicator may alternately blink red and green to indicate that the room will transition to unoccupied status. Such an indication enables the user to see that the meeting room is available for the next block of time and plan accordingly. For example, if the user thinks the meeting will run past 2:00 PM, then the user can reserve the next block of time either physically (e.g., via the physical reserve selection on the MRU) or using the reservation application. If the room is unavailable after 2:00 PM, the in-room indicator may blink red to indicate that the room will remain occupied because of another reservation. Such an indication enables the user to see that the meeting room is unavailable for the next block of time and plan accordingly. For example, the user may begin wrapping up the meeting to conclude the meeting on time, schedule another meeting to discuss unresolved issues, or search for another room (e.g., via the reservation application) in which to extend the meeting.

Individual meeting rooms may include a meeting coordination unit (MCU), e.g., a type of HIS, a specialized type of hardware device to provide the functions described herein. The MCU may coordinate the various aspects of a meeting. For example, the MCU may determine that a meeting is scheduled to begin within a predetermined amount of time (e.g., P seconds, where P is greater than or equal to zero) and determine if the meeting has an associated conference call (e.g., audio conference or video conference). If the MCU determines that the meeting has an associated conference call, the MCU may automatically (e.g., without human interaction) initiate a series of actions, such as powering on meeting equipment (e.g., projector), powering on conferencing equipment (e.g., audio conferencing device, video conferencing device, or the like), dialing in to a conference bridge and entering the appropriate passcodes (e.g., passcode identifying the conference call, meeting chair/leader passcode, and the like), and other actions related to the meeting that is about to begin in the meeting room. The equipment in the meeting room may have a corresponding identifier (ID) tags, such as, for example, radio frequency ID tags, that enable the MCU to determine which equipment is located in a particular meeting room and then selectively power on the equipment to be used in a meeting. If the meeting room is unoccupied, then the MCU may initiate the series of actions a few minutes prior to the scheduled meeting. If the meeting room is occupied (e.g., the previous occupants are in the process of leaving), then the MCU may initiate the series of actions when the meeting is scheduled to start.

The MCU may determine a status of individual meeting invitees and display a status of individual invitees. For example, the MCU may monitor which remote invitees have joined the conference call and indicate their presence. The MCU may determine a location of local invitees (e.g., those who will be physically attending the meeting) using GPS, WPS, or another location tracking technology to track the local invitees using their phone or tablet and display their current locations. After determining a current location, the MCU may provide an estimated time of arrival (ETA) for local invitees who have not yet arrived in the meeting room. In some cases, the MCU may send a reminder message (e.g., via email, text, or instant message) to those meeting invitees who have not yet physically arrived at the meeting or who are more than a predetermined distance (e.g., Q yards, where Q>0) from the meeting room.

The MCU may include speech recognition technology and respond to verbal questions. For example, a meeting participant (e.g., physically present in the meeting room or has joined the conference call) may ask the MCU, "Where is <name of invitee>?" In response, the MCU may determine the location of the invitee and provide the location information audibly and/or visually, e.g., "<name of invitee> is R yards away", "<name of invitee> is in the elevator", "<name of invitee> has indicated he is unable to attend", and the like. A meeting invitee may instruct the MCU to send a reminder message (e.g., via email, text, or instant message) to one or more invitees, e.g., "Send a reminder message to <name of participant>", "Send a reminder message to all participants who are not physically or electronically present", or the like. In some cases, the MCU may automatically identify invitees that have not joined the meeting and automatically send them a reminder message (e.g., text, email, chat, or other type of message).

As a first example, a computing device (e.g., with the functionality of an MRU and an MCU) may include one or more processors and a memory storing instructions that are executable by the one or more processors to perform various operations. For example, the computing device may receive sensor data from one or more sensors located in a meeting room, determine (e.g., based on the sensor data) that the meeting room is unoccupied, and indicate, using a status indicator, that the meeting room is unoccupied. A first color (e.g., green) displayed (e.g., physically and/or electronically) by the status indicator may indicate that the meeting room is unoccupied and a second color (e.g., red) displayed (e.g., physically and/or electronically) by the status indicator may indicate that the meeting room is occupied. A status (e.g., occupied or unoccupied) of the meeting room that is displayed by the status indicator may be accessible to a user's computing device via a network. The one or more sensors may include a motion detection sensor, a heat detection sensor, an infrared detection sensor, another type of sensor, or any combination thereof. For example, if the motion sensor indicates an absence of movement for more than a predetermined period of time, then the computing device may determine that the meeting room is unoccupied. As another example, if temperature data indicates an absence, for more than a predetermined period of time, of a heat source, then the computing device may determine that the meeting room is unoccupied. The computing device may receive a reservation request to reserve a current time slot of the meeting room. In some cases, a user may physically use a reservation selector to make the reservation request. In other cases, a user may use a computer-based meeting reservation user interface (UI) to view available meetings rooms that satisfy user-specified criteria and select a "reserve" UI element to cause the UI to send an electronic reservation request (e.g., across a network) to the computing device. If the computing device determines that the meeting room is currently unoccupied, the computing device may change the status indicator to indicate that the meeting room is occupied. The computing device may receive additional data from the sensors and determine and display, via the status indicator, the current status of the meeting room. For example, if the meeting ended early (e.g., prior to the end of the current time slot), then the computing device may determine (e.g., by detecting the absence of movement for more than a predetermined amount of time) that the meeting room is available and update the status indicator to indicate that the meeting room is available.

As a second example, a computing device (e.g., with the functionality of an MRU and an MCU) may include one or more processors and a memory storing instructions that are executable by the one or more processors to perform various operations. The operations may include receiving sensor data from one or more sensors located in a meeting room, determining, based on the sensor data, that the meeting room is unoccupied, and instructing a status indicator to indicate that the meeting room is unoccupied. The operations may include receiving a reservation request to reserve a current time slot of the meeting room and instructing the status indicator to indicate that the meeting room is occupied. The reservation request may be received in response to (1) a user walking up and physically manipulating a reservation selector or (2) a user selecting a reserve UI element in a meeting reservation application. The operations may include determining that, within a predetermined amount of time, a meeting is scheduled to begin in the meeting room and placing one or more meeting-related devices in the meeting room in an operational state. For example, the computing device may cause devices, such as, for example, a projector, a projection screen, one or more audio conferencing devices (e.g., speakerphone), video conferencing devices (e.g., display device, cameras, microphones, and the like), and other meeting-related devices to be powered on, booted up, warmed up, and set to an appropriate input and output. To illustrate, for a video conference, a display device may be configured to receive video input from a camera in the meeting room. The operations may include determining that, within a predetermined amount of time, a meeting is scheduled to begin in the meeting room and automatically setting up a conference call (e.g., an audio conference call or a video conference call). For example, the computing device may instruct a conferencing device to access (e.g., dial in to) a conference bridge, provide an access code (e.g., to identify a particular conference call), and provide a chairperson code to initiate the conference call. The operations may include determining a presence of individual invitees in a meeting associated with the meeting room and displaying data indicating a first set of meeting invitees that are present (e.g., either on the conference call or physically present in the meeting room) and a second set of meeting invitees that are absent (e.g., either not on the conference call or not physically present in the meeting room). In some cases, the operations may include automatically sending a reminder message to meeting invitees that the computing device determined are absent.

As a third example, a computing device (e.g., with the functionality of an MRU and an MCU) may include one or more processors and a memory storing instructions that are executable by the one or more processors to perform various operations. The operations may include receiving sensor data from one or more sensors located in a meeting room, determining (e.g., based on the sensor data) whether the meeting room is unoccupied, and using a status indicator to indicate whether the meeting room is occupied or unoccupied. The operations may include receiving a reservation request to reserve a current time slot of the meeting room and using the status indicator to indicate that the meeting room is occupied. For example, determining that the meeting room is unoccupied may include determining that motion sensor data indicates a lack of movement for more than a predetermined period of time, determining that temperature data indicates an absence of a heat source for more than a predetermined period of time, or the like. The operations may include receiving the reservation request to reserve the current time slot of the meeting room in response to (1) a user physically selecting a reservation selector or (2) receiving a reservation message sent via a network from a user's computing device. The operations may include determining that, within a predetermined amount of time, a meeting is scheduled to begin in the meeting room and placing meeting-related devices in the meeting room in an operational state. For example, the meeting-related devices may include a projector, a projection screen, a video router, a computing device, an audio conferencing device, or a video conferencing device. The operations may include determining a presence of individual invitees in the meeting and displaying data indicating a first set of meeting invitees that are present (e.g., either on the conference call or physically present in the meeting room) and a second set of meeting invitees that are absent present (e.g., either not on the conference call or not physically present in the meeting room). In some cases, the operations may include automatically sending a reminder message to the second set of meeting invitees. The operations may include determining that, within a predetermined amount of time, a meeting is scheduled to begin in the meeting room and instructing a conferencing device to access a conference bridge and providing one or more codes to initiate the conference call.

FIG. 1 is a block diagram of a facility 100 that includes at least one building with multiple meeting rooms according to some embodiments. The facility 100 may include one or more buildings, such as building 102(1) to building 102(M) (where M>0). Each of the buildings 102 may include zero or more meeting rooms. For example, as illustrated in FIG. 1, the building 102(1) may include meeting rooms 104(1) to 104(N) and the building 102(M) may include meeting rooms 104(N+1) to 104(N+P), where N>0, P>0, N not necessarily equal to P.

Each of the meeting rooms 104 may include a meeting reservation unit (MRU), a meeting coordination unit (MCU), or both. For example, as illustrated in FIG. 1, the meeting room 104(1) may include an associated MRU 106(1) and an MCU 108(1), the meeting room 104(M) may include an associated MRU 106(N) and an MCU 108(N), the meeting room 104(N+1) may include an associated MRU 106(N+1) and an MCU 108(N+1), and the meeting room 104(N+P) may include an associated MRU 106(N+P) and an MCU 108(N+P).

The MRUs 106 and the MCUs 108 may be communicatively coupled via at least one network 110 to computing devices 112(1) to 112(Q) (Q>0). The network 110 may include local area networks (LAN) and wide area networks (WAN). The network 110 may include wired technologies (e.g., Ethernet®) and wireless technologies (e.g., WiFi®, code division multiple access (CDMA), global system for mobile (GSM), universal mobile telephone service (UMTS), Bluetooth®, ZigBee®, and the like). The computing devices 112 may include desktop computing devices, laptop computing devices, tablet computing devices, wireless phones, and the like. The computing devices 112 may include devices associated with employees of a corporation that leases, owns, or occupies the facility 100.

The MRUs 106 may display, physically and/or electronically, a status (e.g., occupied or unoccupied) of the associated meeting rooms 106 to enable users to determine which meeting rooms are currently available and to reserve and begin using a meeting room's current time slot. The MCUs 108 may prepare the devices in a room for a conference call by powering on devices, dialing into a conference bridge and providing the appropriate access codes, determining the status of invitees, sending reminders to invitees, and the like. For example, each piece of equipment in a meeting room may have a tag (e.g., RFID tag) that enables the MCU to determine what equipment is located in the meeting room, and power on the equipment to be used in meeting that is scheduled to begin in the near future (e.g., 15 minutes or less). The functions of the MRUs 106 and the MCUs are detailed below.

While the MRUs 106 are illustrated in FIG. 1 as being separate from the MCUs 108, in some cases, the functionality of both units may be combined into a single device. For example, the functionality of the MRU 106(N) and the MCU 106(N) may be combined into a single device that provides the functions of both the MRU 106(N) and the MCU 106(N).

Figure 2:
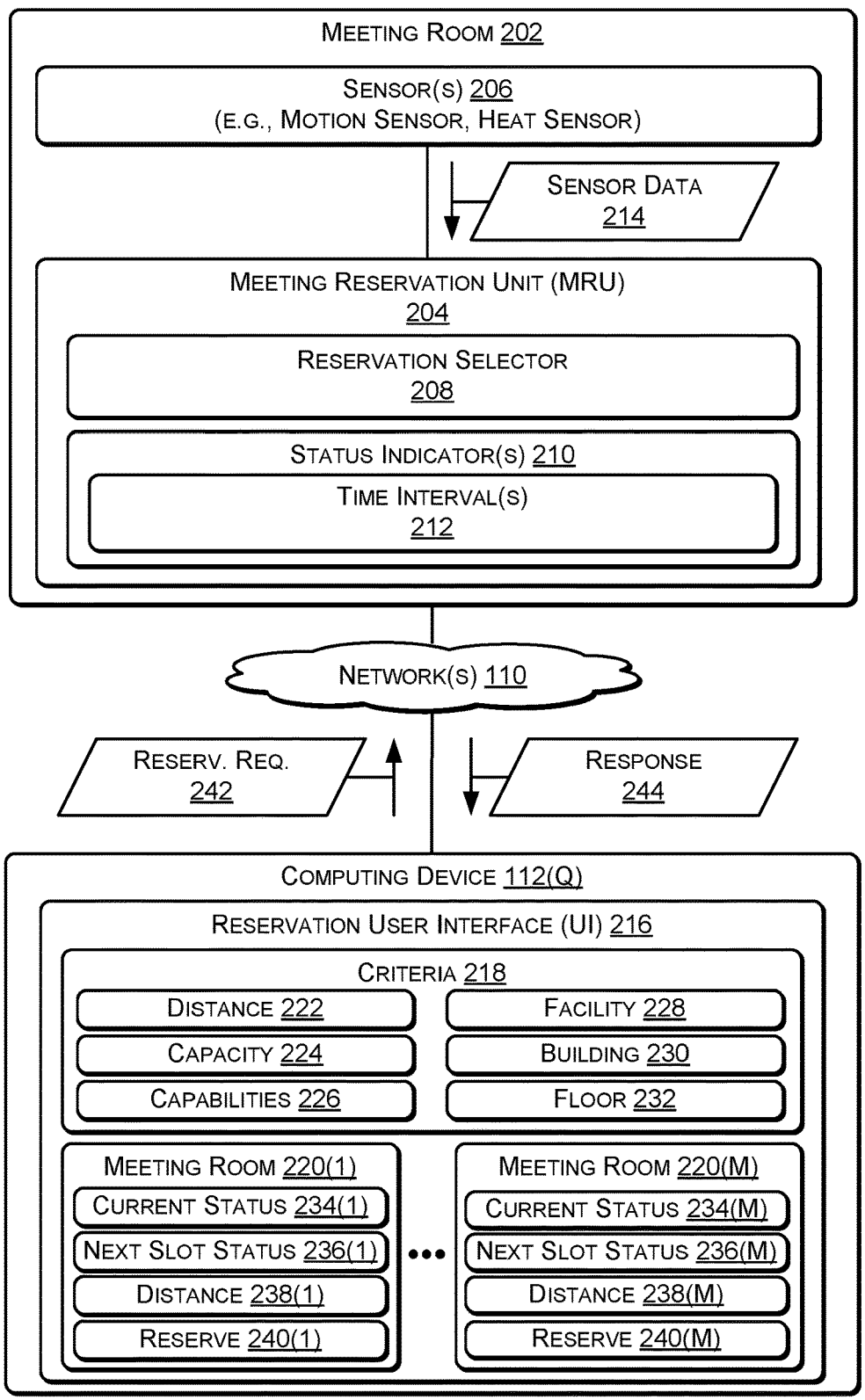
FIG. 2 is a block diagram illustrating a meeting room that includes a meeting reservation unit according to some embodiments.

FIG. 2 is a block diagram 200 illustrating a meeting room that includes a meeting reservation unit (MRU) according to some embodiments. For example, a meeting room 202 (e.g., one of the meeting rooms 104 of FIG. 1) may include an associated MRU 204 (e.g., one of the MRUs 106 of FIG. 1) and one or more sensors 206.

The MRU 204 may include a reservation selector 208 and a status indicator 210. The reservation selector 208 may include a physical selection mechanism (e.g., a button or other mechanism) to enable a user to physically walk up and reserve the meeting room 202. The reservation selector 208 may include a network-accessible electronic selector to enable a user to make a reservation via the network 110 using a software application executing on a computing device.

The status indicator 210 may indicate whether the room is occupied, unoccupied, or transitioning from one status to another (e.g., from occupied to unoccupied or from unoccupied to occupied). For example, green may indicate the room is unoccupied, red may indicate the rooms is occupied, and alternating red and green may indicate that the room is transitioning. To illustrate, red may be displayed for a long period of time and green may be displayed for a shorter period of time to indicate that the room is transitioning from occupied (red) to unoccupied (green). Green may be displayed for a long period of time and red may be displayed for a shorter period of time to indicate that the room is transitioning from unoccupied (green) to occupied (red). As the difference between the current time and the transition time (e.g., the time when the transition is to occur) decreases, the period of time each color is displayed may change based on the proximity of the current time to the transition time. For example, the longer time period may become shorter while the shorter time period may become longer as the difference between the current time and the time when the transition is to occur decreases. One or more time intervals 212 may determine various timing aspects associated with the status indicators 210. For example, one of the time intervals 212 may specify when the status indicators 210 begin indicating a transition (e.g., X minutes prior to the current reservation expiring, X>0). To illustrate, the status indicators 210 may begin indicating a transition 15, 10, or 5 minutes prior (e.g., X=15, 10, or 5) to the current reservation expiring.

The MRU 204 may be mounted in a wall, with one of the status indicators 210 and the reservation selector 208 displayed on the outside of the meeting room 202 (e.g., in a hallway) and another of the status indicators 210 displayed inside the meeting room. The status indicator 210 displayed on the outside of the meeting room 202 may enable a user to visually view the status and use the reservation selector 208 to reserve the current time slot of the meeting room 202. The status indicator 210 displayed inside the meeting room may enable participants to determine when the reservation will expire (e.g., when the room occupants are to leave the meeting room 202), whether the next time slot of the meeting room 202 is available (e.g., unreserved), and enable the users to re-book the room for the next time slot if the next time slot is available.

The sensors 206 may include various types of sensors capable of detecting that one or more human beings are occupying the meeting room 202. For example, the sensors 206 may include a motion sensor, a heat sensor, an infrared sensor, another type of sensor, or any combination thereof. The MRU 214 may receive sensor data 214 from the sensors 206 and determine, based on the sensor data 214, a status of the meeting room 202, e.g., whether the meeting room 202 is occupied or unoccupied. For example, if the MRU 214 does not receive sensor data 214 (e.g., motion sensor data, heat data, or the like) indicating the presence of a human being for more than a predetermined amount of time (e.g., Y minutes, where Y>0, such as, for example 5 minutes), then the MRU 214 may determine that the meeting room 202 is unoccupied and modify the status indicators 210 to indicate that the meeting room is unoccupied (e.g., the status indicators 210 may display red).

In addition to users walking up and physically manipulating the reservation selector 208 to make a reservation of the current time slot of the meeting room 202, the MRU 204 may enable users to view the status of and reserve the meeting room 202 using a software application, such as an internet browser or a dedicated meeting room reservation application. For example, a user may use a reservation UI 216 executing on a computing device, such as the computing device 112(Q), to view the status of meeting rooms 220(1) to 220(M) (M>0) and, if a particular meeting room is available, reserve the particular meeting room. The meeting rooms 220 may be a subset of the meeting rooms 104 of FIG. 1, filtered using criteria 218.

The reservation UI 216 may enable a user to select one or more of the criteria 218 to filter the available meeting rooms 220. The criteria 218 may include a distance 222 (e.g., meeting rooms within a particular distance from a specified location or the user's current location), a capacity 224 of the meeting room (e.g., how many people can be accommodated in the meeting room), and capabilities 226 (e.g., whether the meeting room has (1) a projector to project content from a computing device on to a screen, (2) audio conferencing capabilities, (3) video conferencing capabilities, white board, electronic white board, and the like). The criteria 218 may include location criteria, such as, for example, a facility 228 (e.g., in which facility/location/site the meeting room is located), a building 230 (e.g., in which building the meeting room is located), and a floor 232 (on which floor of a particular building the meeting room is located). To illustrate, the user may use the criteria 218 to identify meeting rooms within the specified distance 222 from a particular location (e.g., the user's current location or another invitee's location), meeting rooms having the capacity 224 to accommodate at least Z number of people (Z>0), meeting rooms with particular capabilities 226 (e.g., rooms including a projector, audio conferencing equipment, video conferencing equipment, or the like), meeting rooms in the same facility, building, or building floor in which the user is located, and the like. Of course, other criteria may be used instead of or in addition to the criteria described herein.

The meeting rooms 220 may be a subset of the available meeting rooms that satisfy the criteria 218. The reservation UI 216 may display information associated with each of the meeting rooms 220. For example, for the meeting room 220(1), the reservation UI 216 may display a current status 234(1) (e.g., is meeting room currently occupied), a next time slot status 236(1) (e.g., is the meeting room available in the next time slot), a distance 238(1) from a user-specified location or the user's current location, and a reserve 240(1) selector. For the meeting room 220(M), the reservation UI 216 may display a current status 234(M) (e.g., is meeting room currently occupied), a next time slot status 236(M) (e.g., is the meeting room available in the next time slot), a distance 238(M) from a user-specified location or the user's current location, and a reserve 240(M) selector. For example, the status indicators 234(M), 236(M) may indicate at 9:45 AM that the meeting room 220(M) is occupied but that the next time slot (e.g., 10:00-11:00 AM) is unreserved/available. The user may select reserve 240(M) to reserve the next time slot. If the status indicators 234(M) indicates at 9:05 AM that the meeting room 220(M) is unreserved/available, the user may select reserve 240(M) to reserve the current time slot. Selecting the reserve 240 UI element may cause a reservation request 242 to be sent to the MRU 204. If the meeting room 202 is available, then the MRU 204 may modify the status indicators 210 and send a response 244 confirming the reservation. If the meeting room 202 is no longer available (e.g., someone else reserved the meeting room 202 before the MRU 204 received the reservation request 242), then the MRU 204 may send the response 244 indicating that the room is no longer available.

Thus, the MRU 204 may enable reservations via walk-up and via the network 110. The MRU 204 may be positioned so that a portion of the MRU 204 is inside the meeting room 202 and a portion of the MRU 204 is outside the meeting room 202. The status indicators 210 may indicate, e.g., using a multi-color light emitting diode (LED), the status of the meeting room 202 inside and outside the meeting room 202. For example, a green indicator may indicate that the meeting room 202 is unoccupied, and a red indicator may indicate that the meeting room 202 is occupied. Thus, the status indicators 210 may enable a user to look down a hallway of a building and visually determine which meeting rooms are currently available.

The meeting room 202 may include the sensors 206, such as, for example, motion detection sensors, heat sensors, or the like to detect the presence (or absence) of human beings. The sensors 206 may provide the sensor data 214 to enable the MRU 204 to detect the presence of humans in the meeting room and determine whether the room is occupied or unoccupied. For example, if a motion detection sensor of the sensors 206 does not detect movement in the meeting room within a predetermined time period (e.g., 5 minutes, 10 minutes, 15 minutes, or the like), then the MRU 204 may determine that the meeting room is unoccupied. The MRU 204 may monitor the sensors 206 and, in response to determining that the meeting room 202 is unoccupied, perform power saving functions, such as turning off the room lights and placing various devices (e.g., computer, projector, conferencing device, and the like) in a power-off or low power consumption mode (e.g., hibernation). In addition, the MRU 204 may modify the status indicators 210 to indicate whether the meeting room 202 is currently occupied or unoccupied. For example, the meeting room 202 may initially (e.g., the beginning of the day) be green, indicating that the meeting room is unoccupied. A user seeking a meeting room may see the green indicator and request to reserve the meeting room 202 for the next N time slots (e.g., where a time slot is a pre-determined period of time, such as, for example, 15 minutes, 30 minutes, an hour, or the like). The request may be made physically, e.g., by the user physically using the reservation selector 208, or the reservation request 242 may be sent by the user selecting reserve 240. In response to receiving the reservation request 242, the MRU 204 may automatically (e.g., without human interaction) change the status indicators 210 from green to red to indicate that the meeting room 202 is (or will soon be) occupied. After the user has completed the meeting and the meeting participants have left the meeting room 202, the user may indicate via the reservation UI 216 that the meeting has concluded or the sensors 206 may provide the sensor data 214 to the MRU 204 to enable the MRU 204 to determine that the meeting room 202 is unoccupied. For example, the user may indicate that the meeting has concluded by physically de-selecting the reservation selector 208, or by sending a clear reservation command using the reservation UI 216.

In addition to the status indicators 210 indicating the status (e.g., occupied or unoccupied) of the meeting room 202, the MRU 204 may make the status of the meeting room available via the network 110. For example, the MRU 204 may include a communications interface to connect the MRU 204 to the network 110 (e.g., using a wired technology, such as Ethernet®, or a wireless technology, such as WiFi®, Bluetooth®, or the like). The MRU 204 may broadcast the status of the meeting room 202 over the network 110. A user may open the reservation UI 216 on the user's computing device 112(Q) (e.g., phone, tablet, laptop, etc.). The UI 216 may determine a location of the user using location technology such as, for example, global positioning satellites (GPS), cell-tower triangulation, or Wi-Fi® positioning system (WPS), and display the status of meeting rooms within the selectable distance 222 from the user. The user may select one or more of the criteria 218 to filter how many meeting rooms 220 are displayed. For example, the user may specify the distance 222, such as N yards (or N meters), and the application may display the meeting rooms 22*o* within the distance 222 from the user. The user may specify additional of the criteria 218 to filter how many of the meeting rooms 220 are displayed. For example, in the facility 100 of FIG. 1 with multiple buildings 102, in which each building has multiple floors, the user may view the status of meeting rooms on (1) a particular floor 232, (2) multiple floors of a particular building 230, or (3) multiple floors of multiple buildings in the facility 100 in which the user is currently located. The UI 216 may enable the user to view the meeting rooms 220 that are currently available and may provide the reserve 240 selector to enable the user to reserve, via the network 110, a particular one of the meeting rooms 220. For example, the user may navigate to the meeting room 220(M) that the UI 216 indicates matches the criteria 218 and select reserve 240(M). In response, the UI 216 may send the reservation request 242 to the MRU 204 to reserve the meeting room 202. The MRU 204 may receive the reservation request 242 and change the status indicators 210 of the meeting room 202 from unoccupied to occupied, e.g., the physical indicator may change from green to red and the MRU 204 may begin broadcasting (e.g., via the network 110) that the meeting room 202 is occupied.

The status indicators 210 may include an indicator in the meeting room 202 to indicate the status of the meeting room. For example, assume a user reserves a meeting room for an hour, e.g., from 1:00-2:00 PM. The status indicator 210 may begin blinking at the pre-determined time interval 212 (e.g., M minutes, where M>0) prior to the end of the hour. For example, the status indicator 210 may begin blinking at 1:50 (M=10) to indicate that the reservation is ending and that the status will change shortly. If the meeting room 202 is available after 2:00 PM, the status indicator 210 may alternately blink red and green to indicate that the room will transition to unoccupied status. Such an indication enables the user to see that the meeting room is available for the next block of time and plan accordingly. For example, if the user thinks the meeting will run past 2:00 PM, then the user can reserve the next block of time either physically (e.g., via the physical reservation selector 208) or using the reservation UI 216. If the meeting room 202 is unavailable after 2:00 PM, the status indicator 210 may blink red to indicate that the meeting room 202 will remain occupied because of another reservation. Such an indication enables the user to see that the meeting room 202 is unavailable for the next block of time and plan accordingly. For example, the user may begin wrapping up the meeting to conclude the meeting on time, schedule another meeting to discuss unresolved issues, or search for another room (e.g., via the reservation UI 216) in which to extend the meeting.

Figure 3:
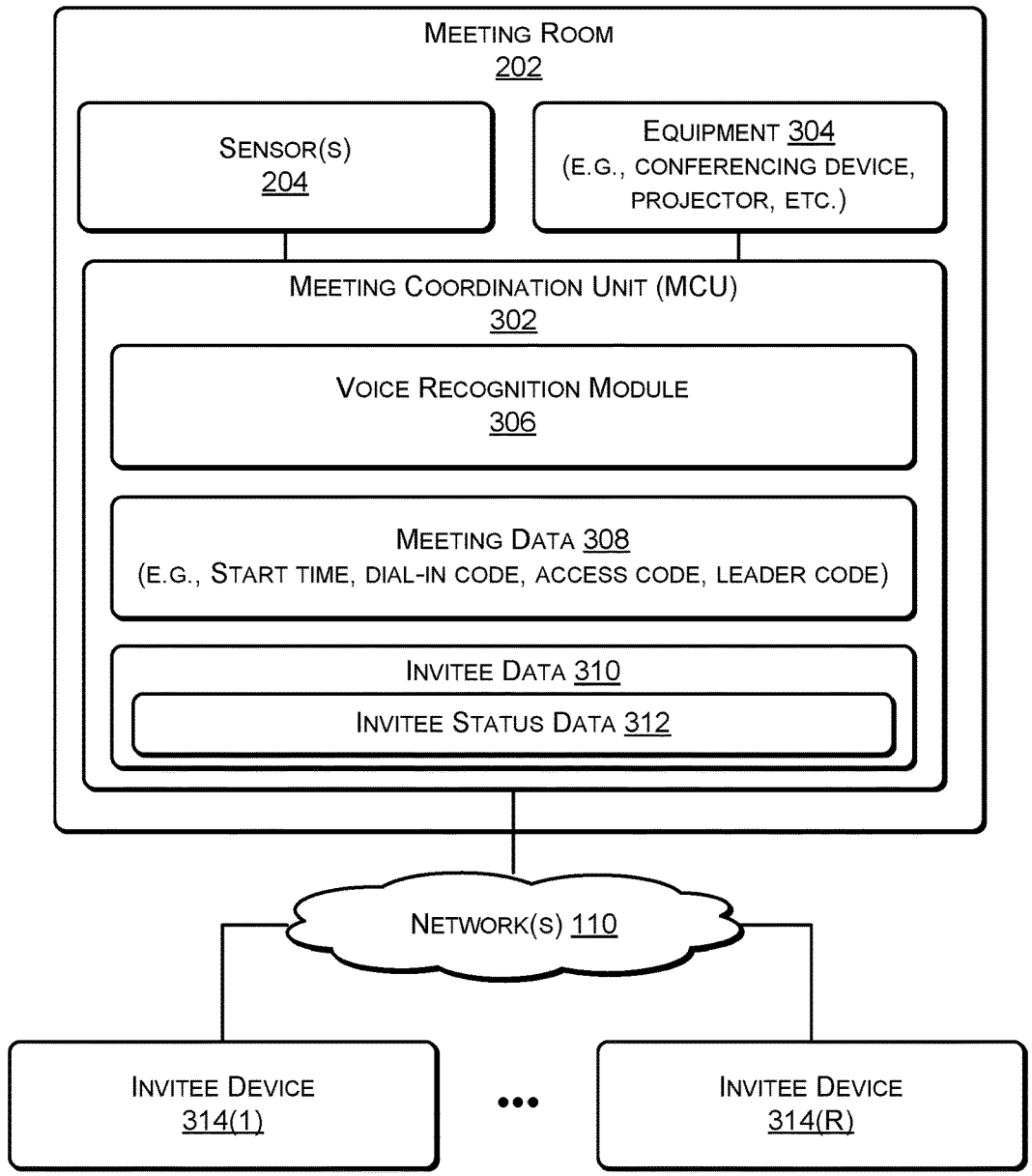
FIG. 3 is a block diagram illustrating a meeting room that includes a meeting coordination unit according to some embodiments.

FIG. 3 is a block diagram 300 illustrating a meeting room that includes a meeting coordination unit (MCU) according to some embodiments. The meeting room 202 (e.g., one of the meeting rooms 104 in the facility 100) may include the one or more sensors 204 of FIG. 2, an MCU 302, and equipment 304. The equipment 304 may include a projector, a screen on which to project, a computing device (e.g., connected to the projector), an electronic whiteboard, audio conferencing devices (e.g., speakerphone, microphones, audio amplifier, and the like), video conferencing devices (e.g., television monitor, video camera, and the like), other conference room related equipment, or any combination thereof.

The MCU 302 may have include a voice recognition module (VRM) 306, and have access to access to meeting data 308, invitee data 310. The MCU 302 may use the meeting data 308 to determine when a meeting is to start in the meeting room 202 and determine if a conference call (e.g., audio conference or video conference) is to be part of the meeting. The MCU 302 may initiate a series of actions to prepare for a meeting and if the meeting includes a conference call, the MCU 302 may use the meeting data 308 to setup the conference call.

If the meeting is scheduled to start at a particular time and the meeting room 202 is unoccupied W minutes (e.g., W>0) prior to when the meeting is to start, then the MCU 302 may initiate the series of actions at W minutes prior to prepare for the scheduled meeting. For example, if the meeting is scheduled to start at 10:00 AM and the meeting room 202 is unoccupied at 9:58 AM, e.g., 2 minutes prior to when the meeting is to start, then the MCU 302 may initiate the series of actions at 9:58 AM to prepare for the 10:00 AM meeting. If the meeting is scheduled to start at a particular time and the meeting room 202 is occupied W minutes (e.g., W>0) prior to when the meeting is to start, then the MCU 302 may initiate the series of actions when the meeting is scheduled to start. For example, if the meeting is scheduled to start at 10:00 AM and the meeting room 202 is occupied at 9:58 AM, then the MCU 302 may initiate the series of actions at 10:00 AM or just a few seconds prior (e.g., 30 seconds prior at 9:59:30 AM).

To prepare the meeting room 202 for a meeting, the MCU 302 may perform a series of actions, such as, for example, powering on one or more pieces of the equipment 304, dialing a conference bridge, entering an access code (e.g., identifying the particular conference call), and the like. If one of the invitees that will be present in the meeting room 202 is the leader/chair of the meeting, then the MCU 302 may enter the chairperson code. Or the MCU 302 may automatically enter the chairperson code to begin the meeting, even if the chairperson is not yet present in the meeting room 202. The equipment 304 that the MCU 302 powers on may be based on the meeting data 308. For example, if the meeting data 308 indicates an audio conference, then the MCU 302 may power on audio conferencing equipment (e.g., of the equipment 304). If the meeting data 308 indicates a video conference, then the MCU 302 may power on video conferencing equipment (e.g., of the equipment 304). If the meeting data 308 indicates a projector is to be used in the meeting, then the MCU 302 may power on a projector, cause a screen to be unfurled, route an input from a video cable to the projector, power on a computing device connected to the projector, perform another projector-related action, or any combination thereof.

The MCU 302 may use the invitee data 310 to determine a location of individual invitees in the meeting and display invitee status 312. For example, the invitee status 312 may use data from the conference bridge to identify which invitees have joined (e.g., are participating in) the conference call and which invitees have not yet joined the conference call. The MCU 302 may use GPS, WPS, or other location-based information to determine a location of invitee devices 314(1) to 314(R) (R>0) corresponding to invitees. Based on the location of the invitee devices 314, the MCU 302 may identify which invitees are currently present in the meeting room 202 and which invitees are within a particular distance from (e.g., or within the same building as) the meeting room 202. The MCU 302 may display the invitee status data 312 indicating the status (e.g., whether they have joined the conference call or are present in the meeting room) of invitees participating via conference call and the status of invitees physically participating in the meeting.

The VRM 306 may enable participants in the meeting that are physically present or participating via conference call to ask the MCU 302 the status (e.g., physically present, not physically present, joined the conference bridge, or not joined the conference bridge) of individual invitees. The MCU 302 may provide answers to questions asked by invitees using a speech synthesizer (e.g., text to speech) or other speech technology. The VRM 306 may enable participants in the meeting that are physically present or participating via conference call to ask the MCU 302 to send reminders (e.g., via text, email, or instant message) to individual invitees that have not yet joined the conference call or who are not currently present in the meeting room 202. In some cases, the MCU 302 may automatically send reminders to meeting invitees that have not yet joined the meeting (e.g., either physically or via conference call) K minutes after the meeting time (where K>0). For example, if a meeting is scheduled to start at 10:00 AM, then at 10:02 AM (K=2) the MCU 302 may send reminder messages to invitees that have not yet joined the meeting.

Thus, the MCU 302 may determine a status of individual invitees and display the invitee status data 312. For example, the MCU 302 may monitor which remote invitees have joined the conference call and indicate their presence. The MCU 302 may determine a location of the invitee devices 314 (e.g., phone, tablet, or computing device) associated with local invitees (e.g., those who will be physically attending the meeting) using GPS, WPS, or another location tracking technology and display their current locations. After determining a current location of individual invitees, the MCU 302 may provide an estimated time of arrival (ETA) for local invitees who have not yet arrived in the meeting room 302. In some cases, the MCU 302 may, automatically or in response to a participant request, send a reminder message (e.g., via email, text, or instant message) to those meeting invitees who have not yet physically arrived at the meeting or who are more than a predetermined distance (e.g., Q yards, where Q>0) from the meeting room.

The MCU 302 may include the VRM 306 and receive and respond to verbal questions. For example, a meeting participant may ask the MCU 302, "Where is Bob?" In response, the MCU 302 may determine the location of the invitee and provide the location information audibly and/or visually, e.g., "Bob is R yards away", "Bob is in the elevator", "Bob has indicated he is unable to attend", or the like. A meeting participant may instruct the MCU to send a reminder message (e.g., via email, text, or instant message) to one or more invitees, e.g., "Send a reminder message to Jane", "Send a reminder message to all invitees who are not physically or electronically present", or the like.

Figure 4:
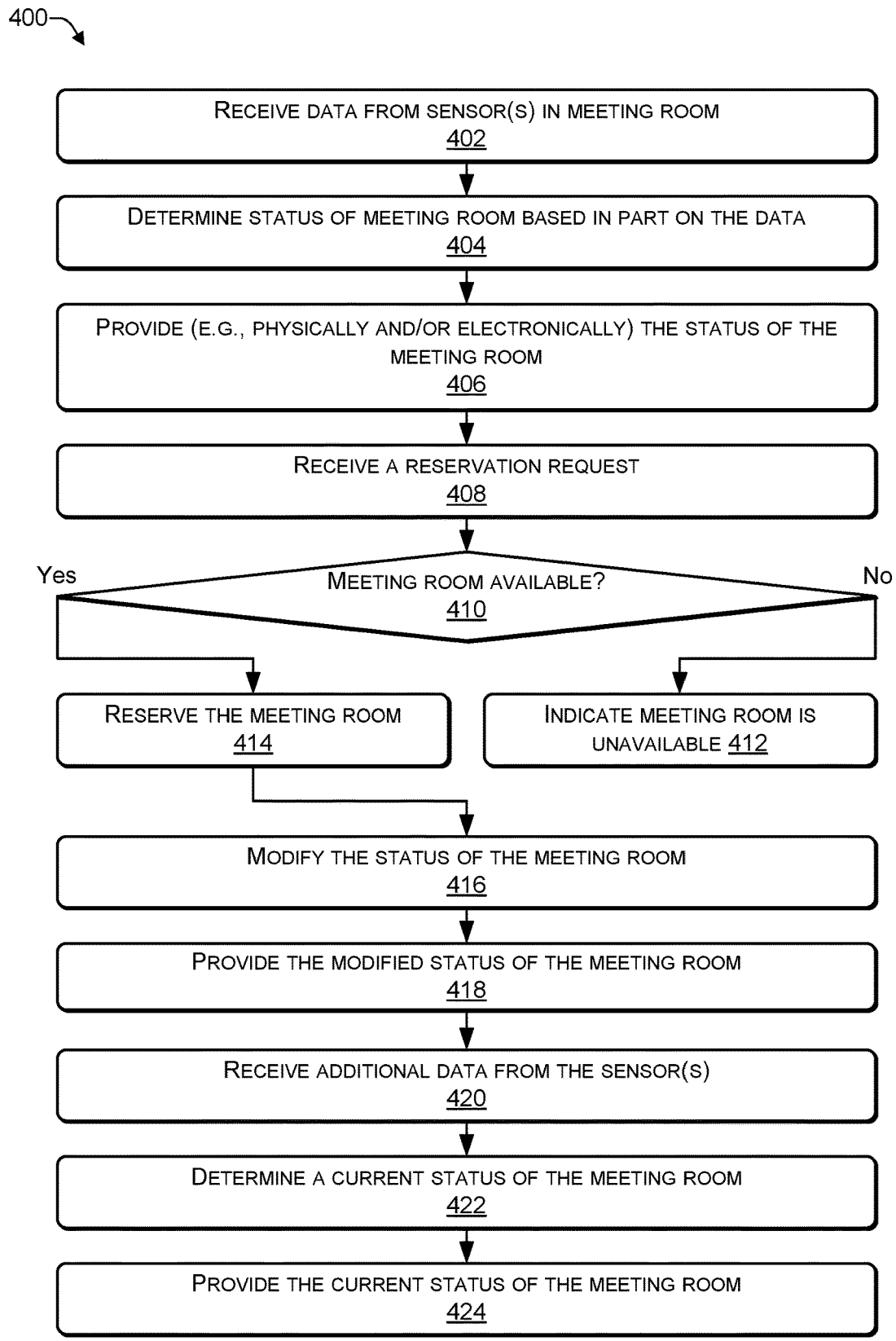
FIG. 4 is a flowchart of a process that includes receiving a reservation request according to some embodiments.
Figure 5:
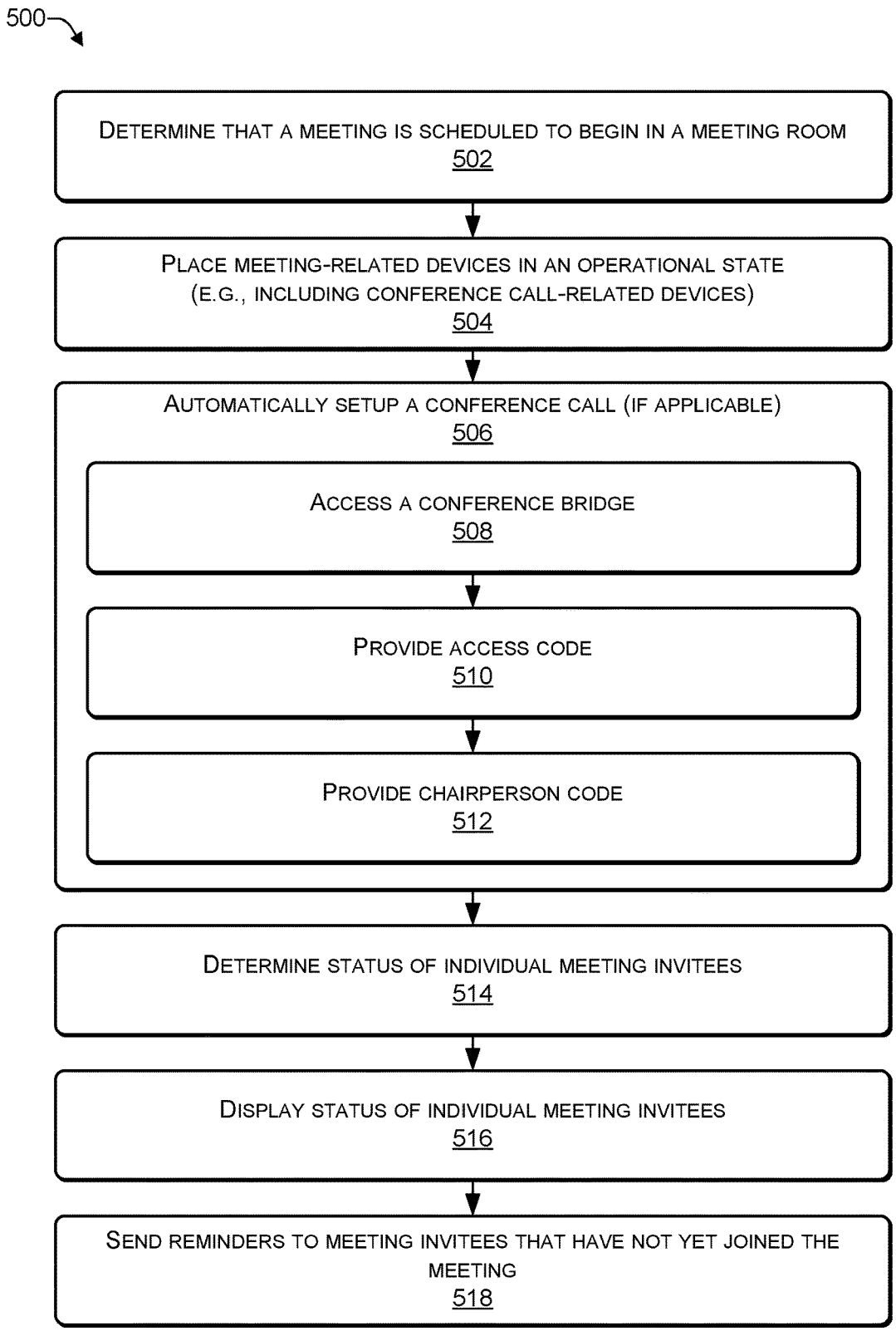
FIG. 5 is a flowchart of a process that includes dialing in to a conference bridge according to some embodiments.

In the flow diagrams of FIG. 4 and FIG. 5, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 400 and 500 are described with reference to FIGS. 1, 2, 3, and 4, as described above, although other models, frameworks, systems and environments may be used to implement this process.

FIG. 4 is a flowchart of a process 400 that includes receiving a reservation request according to some embodiments. The process 400 may be performed by an MRU, such as one of the MRUs 106 of FIG. 1 or the MRU 204 of FIG. 2, or a device that has the combined functionality of an MRU and an MCU.

At 402, sensor data may be received from one or more sensors in a meeting room. At 404, a status of the meeting room may be determined based at least in part on the data received from the sensors. At 406, the status of the meeting may be provided (e.g., physically, electronically, or both). For example, in FIG. 2, the MRU 204 may receive the sensor data 214 from the sensors 206, determine the status (e.g., occupied or unoccupied) of the meeting room 202, and set the status indicators 210 (e.g., green=unoccupied, red=occupied) to indicate the status of the meeting room 202. The status of the meeting room 202 may be provided via the network 110 to enable the status to be viewed using the reservation UI 216.

At 408, a reservation request may be received. At 410, a determination may be made whether the meeting room is still available. If a determination is made, at 410 that "no" the meeting room is not available, then, at 412, an indication may be provided that the meeting room is unavailable and was not reserved. If a determination is made, at 410 that "yes" the meeting room is available, then, at 414, the meeting room is reserved. At 416, the status of the meeting room may be modified (e.g., from unreserved to reserved). At 418, the modified status of the meeting room may be provided. For example, in FIG. 2, a user may walkup to the meeting room 202 and physically use the reservation selector 208 to reserve the currently available time slot of the meeting room 202. A user may use the reservation UI 216 to provide the criteria 218, view the available meeting rooms that satisfy the criteria 218, and send the reservation request 242 by selecting the reserve 240 UI element associated with the meeting room 202. If the meeting room 202 is no longer available, e.g., someone else reserved the meeting room 202 between (1) when the user observed that the meeting room 202 was available and (2) when the MRU 204 received the reservation request 242 or a reservation request via the reservation selector 208, then the response 244 and the status indicator 210 may indicate that the meeting room 202 was not reserved. If the meeting room 202 was available when the reservation request was reserved, then the reservation was successful, e.g., the MRU 204 received the reservation request 242 or a reservation request via the reservation selector 208, and successfully reserved the meeting room 202. After the meeting room 202 has been reserved, the response 244 and the status indicator 210 may indicate that the meeting room 202 has been reserved (e.g., status may change from unoccupied to reserved).

At 420, additional data from the sensors in the meeting room may be received. At 422, a current status of the meeting room may be determined. At 424, the current status of the meeting room may be provided. For example, the MRU 204 may continue to monitor the sensor data 214 sent by the sensors 206 and determine whether the meeting room 202 is occupied or unoccupied and indicate the current status via the status indicators 210 and via the reservation UI 216. The MCU 302 may use the meeting data 308 to determine when a meeting is to start in the meeting room 202 and determine if a conference call (e.g., audio conference or video conference) is to be part of the meeting. The MCU 302 may initiate a series of actions to prepare for a meeting and if the meeting includes a conference call, the MCU 302 may use the meeting data 308 to setup the conference call.

If the meeting is scheduled to start at a particular time and the meeting room 202 is unoccupied W minutes (e.g., W>0)

prior to when the meeting is to start, then the MCU 302 may initiate the series of actions at W minutes prior to prepare for the scheduled meeting. For example, if the meeting is scheduled to start at 10:00 AM and the meeting room 202 is unoccupied at 9:58 AM, e.g., 2 minutes prior to when the meeting is to start, then the MCU 302 may initiate the series of actions at 9:58 AM to prepare for the 10:00 AM meeting. If the meeting is scheduled to start at a particular time and the meeting room 202 is occupied W minutes (e.g., W>0) prior to when the meeting is to start, then the MCU 302 may initiate the series of actions when the meeting is scheduled to start. For example, if the meeting is scheduled to start at 10:00 AM and the meeting room 202 is occupied at 9:58 AM, then the MCU 302 may initiate the series of actions at 10:00 AM or just a few seconds prior (e.g., 30 seconds prior at 9:59:30 AM).

To prepare the meeting room 202 for a meeting, the MCU 302 may perform a series of actions, such as, for example, powering on one or more pieces of the equipment 304, dialing a conference bridge, entering an access code (e.g., identifying the particular conference call), and the like. If one of the invitees that will be present in the meeting room 202 is the leader/chair of the meeting, then the MCU 302 may enter the leader code. The equipment 304 that the MCU 302 powers on may be based on the meeting data 308. For example, if the meeting data 308 indicates an audio conference, then the MCU 302 may power on audio conferencing equipment (e.g., of the equipment 304). If the meeting data 308 indicates a video conference, then the MCU 302 may power on video conferencing equipment (e.g., of the equipment 304). If the meeting data 308 indicates a projector is to be used in the meeting, then the MCU 302 may power on a projector, cause a screen to be unfurled, route an input from a video cable to the projector, power on a computing device connected to the projector, perform another projector-related action, or any combination thereof.

FIG. 5 is a flowchart of a process 500 that includes dialing in to a conference bridge according to some embodiments. The process 500 may be performed by an MCU, such as one of the MCUs 108 of FIG. 1 or the MCU 302 of FIG. 3, or a device that has the combined functionality of an MRU and an MCU.

At 502, a determination may be made that a meeting is scheduled to begin in a meeting room. At 504, meeting-related devices in the meeting room may be placed in an operational (e.g., power-on) state. For example, in FIG. 3, the MCU 302 may use the meeting data 308 (e.g., gathered from a server hosting a calendar application such as Outlook®) to determine meeting-related information, such as when the meeting in the meeting room 202 is scheduled to start, the invitees to the meeting, the equipment to be used in the meeting, whether the meeting includes remotely-located participants that are participating in the meeting via an audio conference or a video conference, and the like. To prepare the meeting room 202 for a meeting, the MCU 302 may perform a series of actions, such as, for example, placing various devices associated with the meeting in an operational state. For example, the MCU 302 may automatically (e.g., without human interaction) power-on one or more of the equipment 304, automatically route audio/video inputs and outputs, and the like. The equipment 304 that the MCU 302 powers on may be based on the meeting data 308. For example, if the meeting data 308 indicates an audio conference, then the MCU 302 may power on audio conferencing equipment (e.g., of the equipment 304). If the meeting data 308 indicates a video conference, then the MCU 302 may power on video conferencing equipment (e.g., of the equipment 304). If the meeting data 308 indicates a projector is to be used in the meeting, then the MCU 302 may power on a projector, cause a screen to be placed in a projectable state, route an input from a video cable to the projector, power on a computing device connected to the projector, perform another projector-related action, or any combination thereof.

At 506, if a conference call (e.g., audio conference or video conference) is associated with the meeting room, the conference call may be automatically setup. At 508, a conference bridge may be accessed (e.g., dialed into). At 510, an access code associated with the conference call may be automatically entered. In some cases, at 512, a chairperson code may be entered. For example, in FIG. 3, if the meeting includes a conference call, the MCU 302 may use the meeting data 308 to setup the conference call. If the meeting is scheduled to start at a particular time and the meeting room 202 is unoccupied W minutes (e.g., W>0) prior to when the meeting is to start, then the MCU 302 may initiate the series of actions at W minutes prior to prepare for the scheduled meeting. For example, if the meeting is scheduled to start at 10:00 AM and the meeting room 202 is unoccupied at 9:58 AM, e.g., 2 minutes prior to when the meeting is to start, then the MCU 302 may initiate the series of actions at 9:58 AM to prepare for the 10:00 AM meeting. If the meeting is scheduled to start at a particular time and the meeting room 202 is occupied W minutes (e.g., W>0) prior to when the meeting is to start, then the MCU 302 may initiate the series of actions when the meeting is scheduled to start. For example, if the meeting is scheduled to start at 10:00 AM and the meeting room 202 is occupied at 9:58 AM, then the MCU 302 may initiate the series of actions at 10:00 AM or just a few seconds prior (e.g., 30 seconds prior at 9:59:30 AM). The MCU 302 may enter the chairperson (e.g., meeting leader) code to begin the meeting. By using the MCU 302 to automatically setup the meeting room and setup the conference call, the meeting can begin sooner than compared to a conventional meeting. In this way, meeting participants may wait for a relatively short time after the scheduled start time for the meeting to begin, saving a corporation time and money. In contrast, in a conventional meeting room, the chairperson may enter the meeting room, power-on the appropriate devices, wait for the devices to become operation (e.g., boot-up etc.), dial the conference bridge, enter the appropriate codes, and the like, which can take several minutes, thereby wasting the time of multiple participants.

At 514, a status of individual meeting invitees may be determined. At 516, the status of the individual meeting invitees may be displayed. For example, in FIG. 3, the MCU 302 may use the invitee data 310 to determine a location of individual invitees in the meeting and display invitee status 312. The invitee status 312 may be determined by using data from the conference bridge to identify which invitees have joined the conference call and which invitees have not joined the conference call. The MCU 302 may use GPS, WPS, or other location-based information to determine a location of invitee devices 314(1) to 314(R) (R>0) corresponding to invitees. Based on the location of the invitee devices 314, the MCU 302 may identify which invitees are currently present in the meeting room 202 and which invitees are within a particular distance from (e.g., or within the same building as) the meeting room 202. The MCU 302 may display the invitee status data 312 indicating the status (e.g., whether they have joined the conference call or are present in the meeting room) of invitees participating via conference call and the status of invitees physically participating in the meeting.

At 518, reminders may be sent to meeting invitees that have not yet joined the meeting (e.g., within K minutes after the meeting start time, K>0). The MCU 302 may send the reminders automatically or in response to one of the participants (or the chairperson) instructing the MCU 302 to send the reminders. For example, in FIG. 3, the VRM 306 may enable participants in the meeting that are physically present or participating via conference call to ask the MCU 302 the status (e.g., physically present, not physically present, joined the conference bridge, or not joined the conference bridge) of individual invitees. The MCU 302 may provide answers to questions asked by participants using a speech synthesizer (e.g., text to speech) or other speech technology. The VRM 306 may enable participants in the meeting that are physically present or participating via conference call to ask the MCU 302 to send reminders (e.g., via text, email, or instant message) to individual invitees that have not joined the conference call or who are not present in the meeting room 202. In some cases, the MCU 302 may automatically send reminders to meeting invitees that have not yet joined the meeting (e.g., either physically or via conference call) K minutes after the meeting time (where K>0). For example, if a meeting is scheduled to start at 10:00 AM, then at 10:02 AM (K=2) the MCU 302 may send reminder messages to invitees that have not yet joined the meeting. A meeting participant may instruct the MCU to send a reminder message (e.g., via email, text, or instant message) to one or more invitees, e.g., "Send a reminder message to Jane", "Send a reminder message to all invitees who are not physically or electronically present", or the like.

Thus, the MCU 302 may automatically place devices in a meeting room in an operational state (e.g., powered on, booted up, set to the appropriate input/output settings, the appropriate audio/video routings selected, dialed in to the appropriate bridge, access code entered, chairperson code entered, and the like), thereby enabling a meeting to start relatively close to the scheduled start time rather than forcing participants to wait for someone to manually place the devices in an operational state. In this way, meeting participants may wait a shorter amount of time for the meeting to begin, saving the corporation time and money.

Figure 6:
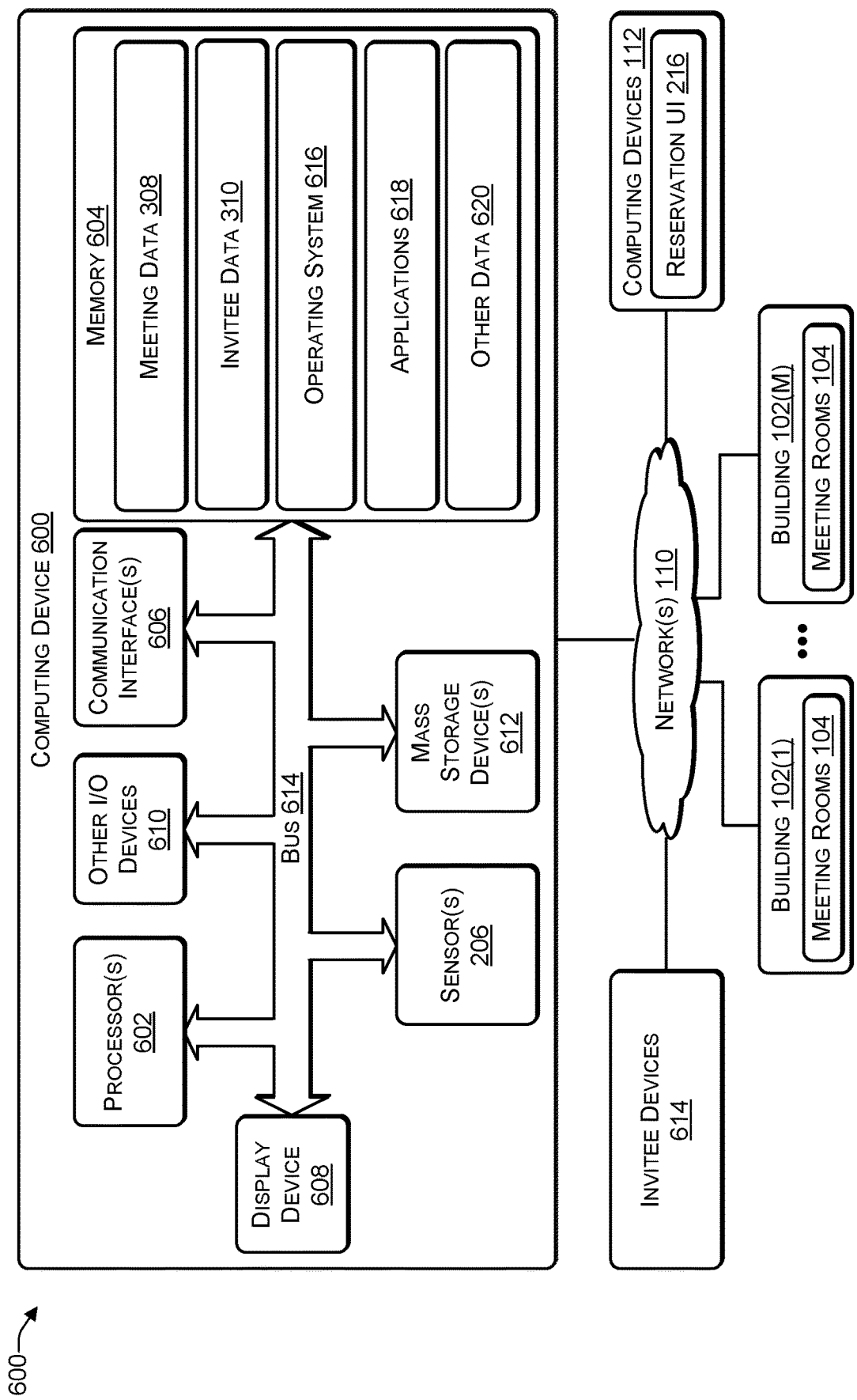
FIG. 6 illustrates an example configuration of a computing device that can be used to implement the systems and techniques described herein.

FIG. 6 illustrates an example configuration of a computing device 600 that can be used to implement the systems and techniques described herein, such as for example, the MRUs 106 and MCUs 108 of FIG. 1, the MRU 204 of FIG. 2, and the MCU 302 of FIG. 3. The computing device 100 may include one or more processors 602 (e.g., CPU, GPU, or the like), a memory 604, communication interfaces 606, a display device 608, other input/output (I/O) devices 610 (e.g., keyboard, trackball, and the like), the sensors 206, and one or more mass storage devices 612 (e.g., disk drive, solid state disk drive, or the like), configured to communicate with each other, such as via one or more system buses 614 or other suitable connections. While a single system bus 614 is illustrated for ease of understanding, it should be understood that the system buses 614 may include multiple buses, such as a memory device bus, a storage device bus (e.g., serial ATA (SATA) and the like), data buses (e.g., universal serial bus (USB) and the like), video signal buses (e.g., Thunder-Bolt®, DVI, HDMI, and the like), power buses, etc.

The processors 602 are one or more hardware devices that may include a single processing unit or a number of processing units, all of which may include single or multiple computing units or multiple cores. The processors 602 may include a graphics processing unit (GPU) that is integrated into the CPU or the GPU may be a separate processor device from the CPU. The processors 602 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 602 may be configured to fetch and execute computer-readable instructions stored in the memory 604, mass storage devices 612, or other computer-readable media.

Memory 604 and mass storage devices 612 are examples of computer storage media (e.g., memory storage devices) for storing instructions that can be executed by the processors 602 to perform the various functions described herein. For example, memory 604 may include both volatile memory and non-volatile memory (e.g., RAM, ROM, or the like) devices. Further, mass storage devices 612 may include hard disk drives, solid-state drives, removable media, including external and removable drives, memory cards, flash memory, floppy disks, optical disks (e.g., CD, DVD), a storage array, a network attached storage, a storage area network, or the like. Both memory 604 and mass storage devices 612 may be collectively referred to as memory or computer storage media herein, and may be any type of non-transitory media capable of storing computer-readable, processor-executable program instructions as computer program code that can be executed by the processors 602 as a particular machine configured for carrying out the operations and functions described in the implementations herein.

The computing device 600 may include one or more communication interfaces 606 for exchanging data via the network 110. The communication interfaces 606 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 606 can also provide communication with external storage, such as a storage array, network attached storage, storage area network, cloud storage, or the like.

The display device 608 may be used for displaying content (e.g., information and images) to users. Other I/O devices 610 may be devices that receive various inputs from a user and provide various outputs to the user, and may include a keyboard, a touchpad, a mouse, a printer, audio input/output devices, and so forth.

The computer storage media, such as memory 116 and mass storage devices 612, may be used to store software and data. For example, the computer storage media may be used to store the meeting data 308, the invitee data 310, an operating system 616, one or more software applications 618, and other data 620.

The computing device 600 may be communicatively coupled via the network 110 to the invitees devices 614 and the computing devices 112. The computing devices 112 may execute an application to display the reservation UI 216 to enable the computing devices 112 to view meeting rooms that satisfy user-specified criteria and reserve a particular meeting room.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    executing, by a computing device, a meeting reservation application;
    determining a location of the computing device;
    determining, via a user interface of the meeting reservation application, one or more criteria comprising:
        a distance from the location;
        a time slot; and
        at least one piece of equipment;
    retrieving, by the computing device, a subset of available meeting rooms that satisfy the one or more criteria;
    accessing, by the computing device, a facilities management computer that manages heating, ventilation, and cooling associated with facilities that include the subset of available meeting rooms;
    determining, by the computing device, using the facilities management computer, meeting rooms booked before and after the time slot;
    ordering, by the computing device, the subset of available meeting rooms based on the meeting rooms booked before and after the time slot to create ordered meeting rooms;
    displaying, by the computing device, the ordered meeting rooms in a user interface of the meeting reservation application;
    receiving, via the user interface and by the computing device, a selection of a particular meeting room of the subset of available meeting rooms;
    sending, by the computing device, a reservation request to a meeting reservation unit associated with the particular meeting room to reserve the particular meeting room during the time slot;
    receiving a response from the meeting reservation unit associated with the particular meeting room indicating that the particular meeting room is reserved based on the reservation request; and
    sending one or more actions for the meeting reservation unit to perform at a start time of the time slot, the one or more actions comprising:
        determining a status of the at least one piece of equipment in the particular meeting room; and
        controlling a setting of the at least one piece of equipment in the particular meeting room based at least in part on:
            the status of the at least one piece of equipment; and
            one or more settings, specified in the reservation request, of the at least one piece of equipment.

2. The method of claim 1, wherein the one or more criteria further comprise:
    a room capacity; and
    room capabilities.

3. The method of claim 1, wherein the at least one piece of equipment comprises at least one of:
    a projector to project content from a second computing device on to a screen;
    an audio conferencing capability;
    a video conferencing capability; or
    a white board.

4. The method of claim 1, further comprising:
    displaying the response from the meeting reservation unit associated with the particular meeting room using the user interface of the meeting reservation application, the response indicating that the particular meeting room was successfully reserved during the time slot.

5. The method of claim 1, wherein the facilities management computer:
    initiates heating or cooling the particular meeting room a predetermined amount of time prior to the start time of the time slot to bring an ambient temperature of the particular meeting room to a predetermined temperature.

6. The method of claim 1, wherein the one or more actions for the meeting reservation unit to perform at the start time of the time slot comprise:
    automatically powering on the at least one piece of equipment prior to the start time of the time slot.

7. The method of claim 1, wherein the one or more actions for the meeting reservation unit to perform at the start time of the time slot comprise:
    automatically initiating a conference call in the particular meeting room prior to the start time of the time slot, wherein the conference call comprises one of an audio conference call or a video conference call.

8. A computing device comprising:
    one or more processors; and
    one or more non-transitory computer readable media storing instructions executable by the one or more processors to perform operations comprising:
        executing a meeting reservation application;
        determining a location of the computing device;
        receiving, via a user interface of the meeting reservation application, one or more criteria comprising:

a distance from the location;
a time slot; and
at least one piece of equipment;
retrieving a subset of available meeting rooms that satisfy the one or more criteria;
accessing a facilities management computer that manages heating, ventilation, and cooling associated with facilities that include the subset of available meeting rooms;
determining, using the facilities management computer, meeting rooms booked before and after the time slot;
ordering the subset of available meeting rooms based on the meeting rooms booked before and after the time slot to create ordered meeting rooms;
displaying the ordered meeting rooms in the user interface of the meeting reservation application;
receiving, via the user interface, a selection of a particular meeting room of the subset of available meeting rooms;
sending a reservation request to a meeting reservation unit associated with the particular meeting room to reserve the particular meeting room during the time slot;
receiving a response from the meeting reservation unit associated with the particular meeting room indicating that the particular meeting room is reserved based on the reservation request; and
sending one or more actions for the meeting reservation unit to perform at a start time of the time slot, the one or more actions comprising:
  determining a status of the at least one piece of equipment in the particular meeting room; and
  controlling a setting of the at least one piece of equipment in the particular meeting room based at least in part on:
    the status of the at least one piece of equipment; and
    one or more settings, specified in the reservation request, of the at least one piece of equipment.

9. The computing device of claim 8, the operations further comprising:
displaying the response from the meeting reservation unit associated with the particular meeting room using the user interface of the meeting reservation application, the response indicating that the particular meeting room was successfully reserved during the time slot.

10. The computing device of claim 8, wherein the one or more actions for the meeting reservation unit to perform at the start time of the time slot comprise:
determining that a meeting is scheduled to begin in the particular meeting room; and
automatically placing one or more meeting-related devices in the meeting room in an operational state, wherein the one or more meeting-related devices include at least one of: a projector, a projection screen, a video router, a second computing device, an audio conferencing device, or a video conferencing device.

11. The computing device of claim 8, wherein the one or more actions for the meeting reservation unit to perform at the start time of the time slot comprise:
determining that a meeting is scheduled to begin in the particular meeting room;
automatically instructing a conferencing device associated with the particular meeting room to access a conference bridge; and
automatically providing an access code identifying a particular conference call to the conference device.

12. The computing device of claim 8, wherein the one or more actions for the meeting reservation unit to perform at the start time of the time slot comprise:
automatically determining a presence of individual invitees in a meeting associated with the meeting room;
automatically displaying data indicating:
  a first set of meeting invitees that are present; and
  a second set of meeting invitees that are absent from the meeting; and
automatically sending a reminder message to a portion of meeting invitees that are determined to be absent from a meeting in the meeting room.

13. The computing device of claim 8, wherein the facilities management computer:
initiates heating or cooling the particular meeting room a predetermined amount of time prior to the start time of the time slot to bring an ambient temperature of the particular meeting room to a predetermined temperature.

14. One or more non-transitory computer readable media storing instructions executable by one or more processors of a computing device to perform operations comprising:
executing a meeting reservation application;
determining a location of the computing device;
receiving, via a user interface of the meeting reservation application, one or more criteria comprising:
  a distance from the location;
  a time slot; and
  at least one piece of equipment;
retrieving a subset of available meeting rooms that satisfy the one or more criteria;
accessing a facilities management computer that manages heating, ventilation, and cooling associated with facilities that include the subset of available meeting rooms;
determining, using the facilities management computer, meeting rooms booked before and after the time slot;
ordering the subset of available meeting rooms based on the meeting rooms booked before and after the time slot to create ordered meeting rooms;
displaying the ordered meeting rooms in the user interface of the meeting reservation application;
receiving, via the user interface, a selection of a particular meeting room of the subset of available meeting rooms;
sending a reservation request to a meeting reservation unit associated with the particular meeting room to reserve the particular meeting room during the time slot;
receiving a response from the meeting reservation unit associated with the particular meeting room indicating that the particular meeting room is reserved based on the reservation request; and
sending one or more actions for the meeting reservation unit to perform at a start time of the time slot, the one or more actions comprising:
  determining a status of the at least one piece of equipment in the particular meeting room; and
  controlling a setting of the at least one piece of equipment in the particular meeting room based at least in part on:
    the status of the at least one piece of equipment; and
    one or more settings, specified in the reservation request, of the at least one piece of equipment.

15. The one or more non-transitory computer readable media of claim 14, wherein the one or more criteria further comprise:

a room capacity; and room capabilities.

16. The one or more non-transitory computer readable media of claim 14, wherein the at least one piece of equipment comprises at least one of:
   a projector to project content from a second computing device on to a screen;
   an audio conferencing capability;
   a video conferencing capability; or
   a white board.

17. The one or more non-transitory computer readable media of claim 14, the operations further comprising:
   displaying the response from the meeting reservation unit associated with the particular meeting room using the user interface of the meeting reservation application.

18. The one or more non-transitory computer readable media of claim 14, the operations further comprising:
   sending a second reservation request to a second meeting reservation unit associated with a second meeting room to reserve the second meeting room during a second time slot;
   receiving a second response from the second meeting reservation unit indicating that the second meeting room is unavailable during the second time slot;
   displaying the second response using the user interface of the meeting reservation application;
   receiving, via the user interface, a selection of a third meeting room; and
   sending a third reservation request to a third meeting reservation unit associated with the third meeting room to reserve the third meeting room during the second time slot.

19. The one or more non-transitory computer readable media of claim 14, wherein the one or more actions for the meeting reservation unit to perform at the start time of the time slot comprise:
   automatically powering on equipment located in the particular meeting room prior to the start time of the time slot;
   automatically initiating a conference call in the particular meeting room prior to the start time of the time slot, wherein the conference call comprises one of an audio conference call or a video conference call;
   determining a presence of individual invitees on the conference call;
   displaying data indicating:
      a first set of meeting invitees that are present; and
      a second set of meeting invitees that are absent from the conference call; and
   automatically sending a reminder message to the second set of meeting invitees.

20. The one or more non-transitory computer readable media of claim 14, wherein the facilities management computer:
   initiates heating or cooling the particular meeting room a predetermined amount of time prior to the start time of the time slot to bring an ambient temperature of the particular meeting room to a predetermined temperature.

\* \* \* \* \*